(12) United States Patent
Hu et al.

(10) Patent No.: US 9,203,521 B2
(45) Date of Patent: Dec. 1, 2015

(54) COMBINING I-Q AND/OR POLMUX OPTICAL RECEIVER TO ENABLE SINGLE DETECTOR

(71) Applicant: NEC Laboratories America, Inc., Princeton, NJ (US)

(72) Inventors: Junqiang Hu, Davis, CA (US); Ting Wang, West Windsor, NJ (US); Lei Xu, Princeton Junction, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/457,460

(22) Filed: Aug. 12, 2014

(65) Prior Publication Data

US 2015/0043927 A1  Feb. 12, 2015

Related U.S. Application Data

(60) Provisional application No. 61/864,739, filed on Aug. 12, 2013.

(51) Int. Cl.
*H04B 10/06* (2006.01)
*H04B 10/61* (2013.01)

(52) U.S. Cl.
CPC ............ *H04B 10/613* (2013.01); *H04B 10/612* (2013.01); *H04B 10/614* (2013.01)

(58) Field of Classification Search
CPC .. H04B 10/61; H04B 10/616; H04B 10/6162; H04B 10/6161; H04B 10/6164; H04B 10/613; H04B 10/614; H04B 10/615; H04B 10/6151; H04B 10/6165; H04B 10/548
USPC ......... 398/202, 203, 204, 205, 206, 207, 208, 398/209, 183, 188, 158, 159, 152, 65, 135, 398/136, 212, 213, 214
See application file for complete search history.

(56) References Cited

U.S. PATENT DOCUMENTS 8,406,638 B2 *  3/2013  Hoshida ................. 398/202
8,983,309 B2 *  3/2015  Harley et al. .......... 398/206

* cited by examiner

*Primary Examiner* — Hanh Phan
(74) *Attorney, Agent, or Firm* — Joseph Kolodka

(57) ABSTRACT

A method for reducing optical components at a receiver which include converting an input signal at a receiver to include an interleaving of alternate signal diversity components, the signal diversity components including phase diversity when the converting includes 0 and 90 degree interleaving and the signal diversity components include polarization diversity interleaving when the converting includes interleaved orthogonal polarizations, and combining the signal diversity components for enabling a single photo detection at the receiver to detect the alternative signal diversity components for subsequent analog-to-digital conversion.

12 Claims, 3 Drawing Sheets

COMBINING I-Q AND/OR POLMUX OPTICAL RECEIVER TO ENABLE SINGLE DETECTOR

RELATED APPLICATION INFORMATION

This application claims priority to provisional application No. 61/864,739 filed Aug. 12, 2013, entitled "Combining I-Q and/or PolMux Optical Receiver to Enable Single Detector", the contents thereof are incorporated herein by reference.

BACKGROUND OF THE INVENTION

The present invention relates generally to optics, and more particularly, to combining I-Q and/or PolMux optical receiver to enable single detector.

Dual-polarization QPSK/xPSK/xQAM (DP-QPSK/xPSK/xQAM) modulation with coherent receiver and digital signal processing is becoming the dominant technology for long-haul transmission, because of the high spectral-efficiency, the tolerance of polarization-mode dispersion, the ability of full-range chromatic dispersion compensation, and the resulting excellent performance. FIG. 1 is the block diagram for one polarization from prior art using this approach. Received signal E(t) has both in-phase and quadrature elements. Both E(t) and locally generated optical signal $E_{LO}$ are first split into two copies using 3-dB coupler. One copy of signal from local oscillator is phase shifted by 90-degree. Then one copy of E(t) is coupled with $E_{LO}$, and the other copy of E(t) is coupled with the 90-degree shifted $E_{LO}$. Both are outputted to a balanced detector and converted to electrical signals, namely in-phase (I) and quadrature (Q) signals respectively.

One obvious drawback for receiver in FIG. 1 is the requirement of 4 photo-detectors (PD, or balanced PD pairs) to receive both polarizations, with each connected to one high-speed ADC. This makes the receiver complicated and more power demanding. As for high-speed ADCs, technology innovations enable even higher rate with wider bandwidth. The extra sampling capability will be wasted if optical signal bandwidth is below (for example, half of) the maximum ADC capability. The present invention provides an approach to utilize the excessive bandwidth/sampling-rate of the high-speed ADCs to reduce the required number of photo-detectors and ADCs.

Accordingly, there is a need for signal detection that overcomes shortcomings of the prior efforts.

BRIEF SUMMARY OF THE INVENTION

The invention is directed a method for reducing optical components at a receiver which include converting an input signal at a receiver to include an interleaving of alternate signal diversity components, the signal diversity components including phase diversity when the converting includes 0 and 90 degree interleaving and the signal diversity components include polarization diversity interleaving when the converting includes interleaved orthogonal polarizations, and combining the signal diversity components for enabling a single photo detection at the receiver to detect the alternative signal diversity components for subsequent analog-to-digital conversion.

In a similar aspect of the invention there is provided a system for reducing optical components at a receiver, the system including means for converting an input signal at a receiver to include an interleaving of alternate signal diversity components, the signal diversity components including phase diversity when the converting includes 0 and 90 degree interleaving and the signal diversity components including polarization diversity interleaving when the converting includes interleaved orthogonal polarizations, and means for combining the signal diversity components for enabling a single photo detection at the receiver to detect the alternative signal diversity components for subsequent analog-to-digital conversion.

These and other advantages of the invention will be apparent to those of ordinary skill in the art by reference to the following detailed description and the accompanying drawings.

DETAILED DESCRIPTION

The present invention is directed to instead of using 0-degree and 90-degree continuous optical signals to generate I and Q channels separately (thus same bandwidth of the generated signal as original), the present invention uses 0-degree and 90-degree INTERLEAVED optical signal (from local oscillator) to couple the received signal, converting both I and Q channels into the same signal, of 2× original bandwidth. This approach enables a single PD and ADC to receive both I and Q signals. This is to combine phase diversity.

Combining the polarization diversity can be done by interleaving the two polarizations in similar approach as I-Q combining One embodiment is rotating the polarization of the received signal by 0 and 90-degree in interleaved mode, then passing through a polarization-maintaining splitter, and detecting one output. One embodiment is coupling the received signal with optical pulses, passing it through polarization-maintained splitter, have the two outputs interleaved and then combined using polarization-beam combiner.

Figure 2:
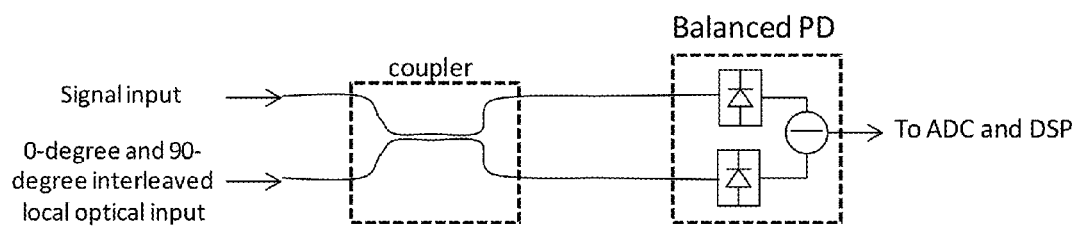
FIG. 2 is a diagram showing 0 and 90 degree phase shift interleaved local oscillator LO coupled with input signal to enable phot detector PD detection.

Instead of using 0-degree and 90-degree continuous waves to generate the I and Q signals respectively, the present invention uses a single optical wave which has 0-degree and 90-degree interleaved phase shift (called phase interleaved signal thereafter). This two-phase interleaved optical signal is coupled with received signal, and the coupled signal is detected by a single PD (followed by ADC and signal processing when needed). This is shown in FIG. 2 using a balanced PD as example, which can also be a single PD.

Figure 3:
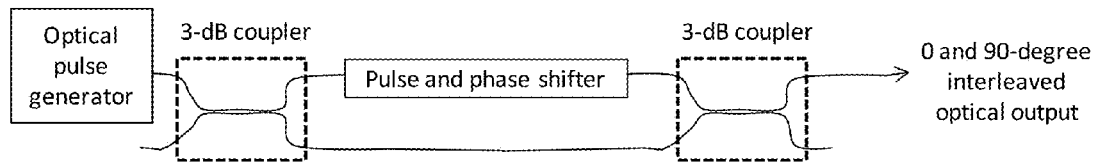
FIG. 3 is a diagram showing an exemplary embodiment for generating 0 and 90 degree interleaved pulse train.
Figure 4:
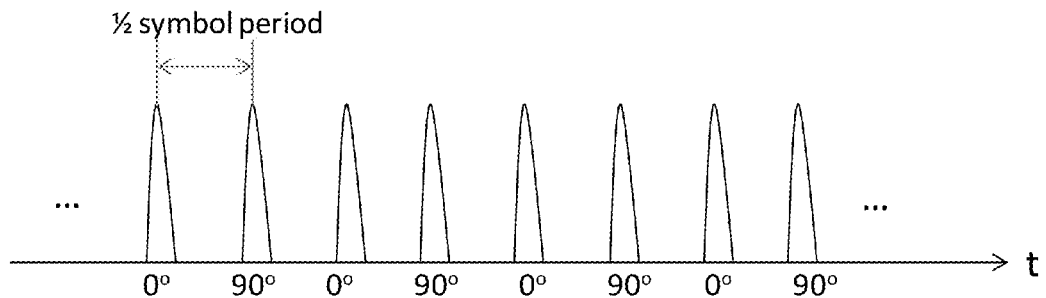
FIG. 4 is a diagram illustrating 0 and 90 degree interleaved pulse train.

One embodiment, to generate the phase interleaved signal, is by interleaving optical pulses. FIG. 3 shows an example to explain this embodiment: optical pulse train with repeating rate same as input symbol is first generated, and split into two channels using 3 dB coupler; the output from one arm is fed into a pulse shifter (to achieve time-domain interleaving or say half-symbol delay comparing to that in the second arm) and a phase shifter (to provide total 90-degree phase shifting comparing to the second arm); this pulse-and-phase-shifted signal is combined with that from the second arm, using another coupler, which will output optical signal with 0 and 90-degree interleaved phase shift. See FIG. 4. An optical waveguide is necessary to keep the desired phase shift. The pulse shifter can be externally controlled to adapt to a different symbol rate. The pulse shifter and phase shifter can be a single element, or separate ones.

Figure 5:
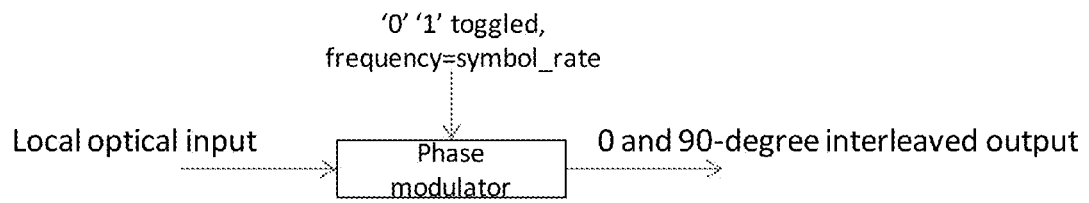
FIG. 5 is a diagram showing signal generation by passing through a phase modulator.

One embodiment to generate the phase interleaved signal is to pass the optical signal through a phase modulator (operates as a controlled phase shifter). This phase modulator is driven by a signal toggling in same frequency as input symbol rate, which puts either x+0 or x+90 degree phase shift, where x can be any value. The driving signal can be square wave with proper amplitude. FIG. 5 illustrates this embodiment. The optical input to the phase modulator can be either pulse train of double symbol rate, or continuous wave. If it is continuous wave, because of non-ideal transition between high and low voltage, an optical pulse carver can be placed anywhere between the phase modulator and photo detector, to keep the 0 and 90 degree phases only. In one embodiment, this carver can be replaced by a high-bandwidth electrical track-and-hold module located before the ADC.

The ADC output is demultiplexed into I and Q signals, and passed to digital signal processing module for signal recovery.

Combining polarization diversity is similar to phase diversity, except that the interleaving is polarization rather than phase.

Figure 6:
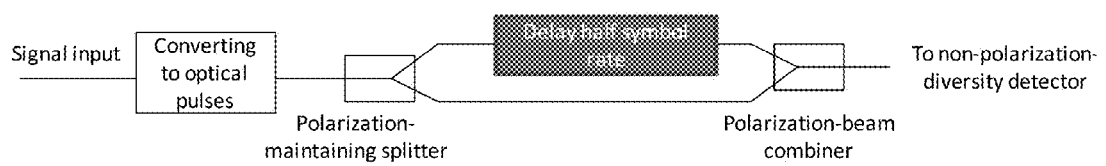
FIG. 6 shows polarization diversity removal using optical pulses and symbol interleaving.
Figure 7:
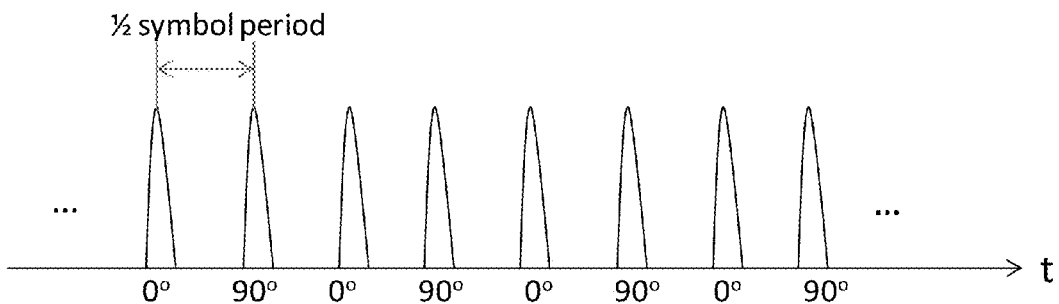
FIG. 7 is a diagram showing combined polarization diversity.

In one embodiment, the input signal is first converted into pulses, and then split into two polarizations. One polarization is then time-shifted by half symbol rate, and combined with the other polarization. The pulses have no more than 50% duty cycle, to avoid overlapping after combining This is shown in FIG. 6. Subsequent detecting is same as traditional solution of single polarization using either optical coherent or non-coherent. Note that the conversion into optical pulses can be after splitting into two polarizations. In a further embodiment, the input signal can be coupled with local optical pulse trains, then polarization split, pulse interleaved, and coupled. The local optical pulse train has double symbol rate. The output is illustrated in FIG. 7, showing interleaved orthogonal polarizations.

Figure 8:
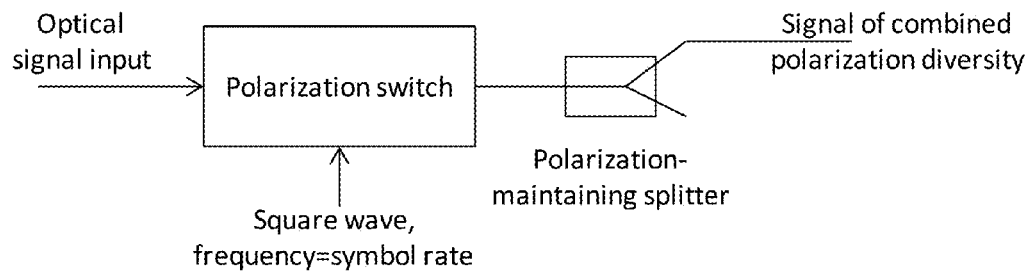
FIG. 8 shows combining polarization diversity by using a polarization switch.

In one embodiment, the polarization interleaved signal is generated from a polarization switch. As shown in FIG. 8, the input signal passes through polarization switch which toggles the polarization between 0 and 90-degree, then got split into two orthogonal polarizations; one polarization is sent to non-polarization diversity detector. The polarization switch has toggling frequency equals to symbol rate. Same as in combining phase diversity, an optical pulse carver may follow this output to avoid the transition period, or a higher-bandwidth track-and-hold module is needed before the ADC, or the received signal is initially converted to optical pulses, or in case of optical coherent detection, local optical signal can be pulse train to achieve the same target.

Figure 1:
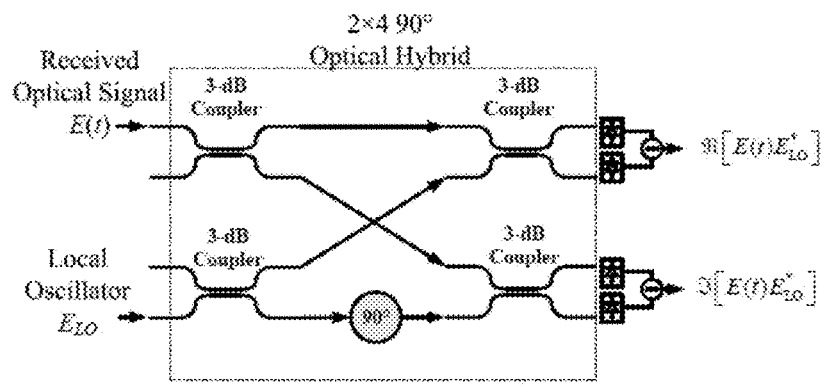
FIG. 1 is a diagram of a prior art coherent optical receiver.

The above mentioned embodiments can be extended to combine both phase diversity and polarization diversity, to enable the detection by a single PD and ADC which has 4× bandwidth and/or sampling rate than traditional solution as in FIG. 1.

The invention may be implemented in hardware, firmware or software, or a combination of the three. Preferably the invention is implemented in a computer program executed on a programmable computer having a processor, a data storage system, volatile and non-volatile memory and/or storage elements, at least one input device and at least one output device. More details are discussed in U.S. Pat. No. 8,380,557, the content of which is incorporated by reference.

Figure 9:
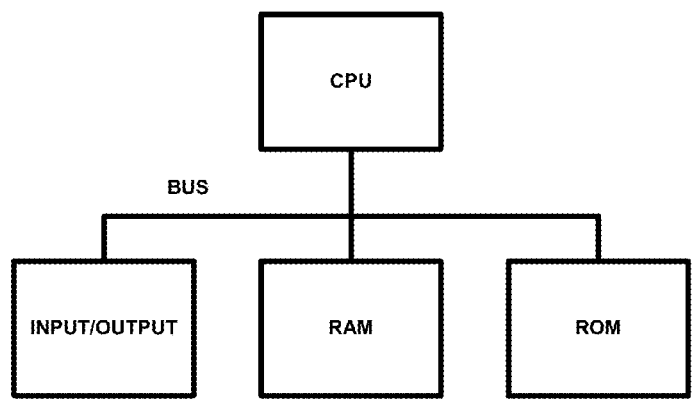
FIG. 9 shows an exemplary computer to perform the invention.

By way of example, a block diagram of a computer to support the system is discussed next in FIG. 9. The computer preferably includes a processor, random access memory (RAM), a program memory (preferably a writable read-only memory (ROM) such as a flash ROM) and an input/output (I/O) controller coupled by a CPU bus. The computer may optionally include a hard drive controller which is coupled to a hard disk and CPU bus. Hard disk may be used for storing application programs, such as the present invention, and data. Alternatively, application programs may be stored in RAM or ROM. I/O controller is coupled by means of an I/O bus to an I/O interface. I/O interface receives and transmits data in analog or digital form over communication links such as a serial link, local area network, wireless link, and parallel link. Optionally, a display, a keyboard and a pointing device (mouse) may also be connected to I/O bus. Alternatively, separate connections (separate buses) may be used for I/O interface, display, keyboard and pointing device. Programmable processing system may be preprogrammed or it may be programmed (and reprogrammed) by downloading a program from another source (e.g., a floppy disk, CD-ROM, or another computer).

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

From the foregoing, it can be appreciated that the present inventive technique of interleaving the received signal either by orthogonal phase, for phase diversity, or by orthogonal polarization, for polarization diversity, or both, provides the advantage of enabling a single detector to receive a signal with polarization and/or phase diversity. The inventive technique reduces system complexity and cost. It also has potential advantage in traffic-dynamic energy savings and future-protecting system investment.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for reducing optical components at a receiver, the method comprising the steps of:
   converting an input signal at a receiver to include an interleaving of alternate signal diversity components, the signal diversity components comprising phase diversity when the converting comprises 0 and 90 degree interleaving and the signal diversity components comprising polarization diversity interleaving when the converting comprises interleaved orthogonal polarizations, wherein diversity is achieved using a shifted pulse train; and combining the signal diversity components for enabling a single photo detection at the receiver to detect the alternative signal diversity components for subsequent analog-to-digital conversion.

2. The method of claim 1, wherein the converting comprises coupling the 0 and 90 degree interleaving with the input signal to create a single signal.

3. The method of claim 1, wherein the converting comprises combining components of the polarization diversity interleaving into a single signal.

4. The method of claim 1, wherein the 0 and 90 degree interleaving comprises interleaved optical pulses that are created by pulse shifting an optical pulse train to achieve a half-symbol delay and phase shifting pulses of the half-symbol delay to provide 90 degree phase shifting compared to the optical pulse before the pulse shifting.

5. The method of claim 1, wherein the polarization diversity interleaving comprises converting the input signal into pulses, and then splitting the pulses into two polarizations with one polarization being time-shifted by a half symbol rate and combined with the other polarization, the pulses having no more than 50% duty cycle to avoid overlapping after combining.

6. The method of claim 1, wherein the polarization diversity interleaving comprises coupling the input signal with locally generated pulse train pulses, then splitting the coupled input signal and pule trains for subsequent pulse interleaving and coupling for providing a pulse train that has double the symbol rate of the input signal.

7. A system for reducing optical components at a receiver, the system comprising:

means for converting an input signal at a receiver to include an interleaving of alternate signal diversity components, the signal diversity components comprising phase diversity when the converting comprises 0 and 90 degree interleaving and the signal diversity components comprising polarization diversity interleaving when the converting comprises interleaved orthogonal polarizations, wherein diversity is achieved using a shifted pulse train; and means for combining the signal diversity components for enabling a single photo detection at the receiver to detect the alternative signal diversity components for subsequent analog-to-digital conversion.

8. The system of claim 7, wherein the means for converting comprise coupling the 0 and 90 degree interleaving with the input signal to create a single signal.

9. The system of claim 7, wherein the means converting comprises combining components of the polarization diversity interleaving into a single signal.

10. The system of claim 7, wherein the 0 and 90 degree interleaving comprises interleaved optical pulses that are created by pulse shifting an optical pulse train to achieve a half-symbol delay and phase shifting pulses of the half-symbol delay to provide 90 degree phase shifting compared to the optical pulse before the pulse shifting.

11. The system of claim 7, wherein the polarization diversity interleaving comprises means for converting the input signal into pulses, and then means for splitting the pulses into two polarizations with one polarization being time-shifted by a half symbol rate and combined with the other polarization, the pulses having no more than 50% duty cycle to avoid overlapping after combining.

12. The system of claim 7, wherein the polarization diversity interleaving comprises means for coupling the input signal with locally generated pulse train pulses, then means for splitting the coupled input signal and pule trains for subsequent pulse interleaving and coupling for providing a pulse train that has double the symbol rate of the input signal.

* * * * *